United States Patent [19]
Yasukawa et al.

[11] Patent Number: 5,594,216
[45] Date of Patent: Jan. 14, 1997

[54] JET ENGINE SOUND-INSULATION STRUCTURE

[75] Inventors: Robert D. Yasukawa, San Jose; James P. Woolley, Sunnyvale; Venecia M. Grobelny, San Jose, all of Calif.

[73] Assignee: Lockheed Missiles & Space Co., Inc., Sunnyvale, Calif.

[21] Appl. No.: 346,081

[22] Filed: Nov. 29, 1994

[51] Int. Cl.$^6$ .................................. F01N 1/02; F02K 1/00
[52] U.S. Cl. ..................... 181/213; 181/286; 181/292; 181/294; 181/296
[58] Field of Search ................................ 181/213, 222, 181/225, 210, 286, 290, 292, 294, 296; 428/116, 117, 118

[56] References Cited

U.S. PATENT DOCUMENTS

| | | | |
|---|---|---|---|
| 3,021,916 | 2/1962 | Kemp | 181/292 |
| 3,211,253 | 10/1965 | Gonzalez | 181/292 |
| 4,147,578 | 4/1979 | Koss | 181/290 X |
| 4,453,887 | 6/1984 | Schucker | 181/213 |
| 4,849,276 | 6/1989 | Bendig et al. | 181/292 X |

*Primary Examiner*—Khanh Dang
*Attorney, Agent, or Firm*—Peter J. Dehlinger

[57] ABSTRACT

An acoustic structure for use as a sound insulator in a jet engine is disclosed. The structure, which is carried in a sound-absorbing compartment of the engine, includes a framework and an acoustical insulation material disposed within the framework. The material is composed of a rigid matrix of randomly oriented, fused silica fibers having fiber diameters predominantly in the range 2–8 µm, a three-dimensionally continuous network of open, intercommunicating voids, a flow resistivity between about 10–200K rayls/m, and a density of between about 2 and 8 lb/ft3. Also disclosed are a clad acoustical structure for sound attenuation in a jet engine, where operational temperatures exceed current jet engine designs, and a method of attenuating jet engine noise.

20 Claims, 8 Drawing Sheets

JET ENGINE SOUND-INSULATION STRUCTURE

FIELD OF THE INVENTION

The present invention relates to structure for attenuating jet engine noise, and to a method employing such structure.

BACKGROUND OF THE INVENTION

With increased competitiveness in the aircraft industry, driven by considerations of size, weight, fuel efficiency, and jet noise, there is an interest in aircraft sound insulators which are lightweight and capable of serving as an effective sound attenuator for jet and high-speed air noises.

The need to reduce jet engine noise is particularly important, both from the point of view of limiting take-off noise at airports, and shielding passengers from engine noise. Noise restrictions in some urban airports limit the types of aircraft that may use the airport, or limit planes to below-maximum passenger and baggage loads.

Currently, engine noise on jet aircraft is damped primarily by annular-ring, honeycomb-type damping structures disposed in the engine housing along intake and exhaust regions of the engine. Typically a stacked array of such structures, usually up to six structures, are employed, with each structure being designed to dissipate sound noise of a characteristic peak frequency of the engine. The peak frequencies are primarily in the 500–6,000 Hz range for both turbofan and turboprop engines.

The stacks of honeycomb structures add substantial weight and size to the engine housing, reducing aerodynamic efficiency. In addition, since the damping structures are designed to dissipate sound near a single peak frequency, non-peak frequency noise may be only poorly attenuated.

There is thus a need for jet engine acoustical insulation structure that is lightweight, compact, able to absorb sound frequencies over a broad frequency range, particularly in the 500 to 6,000 Hz region for turbofan and turboprop engines, and at the same time, able to withstand high operational temperatures of a jet engine.

SUMMARY OF THE INVENTION

These features are achieved, in accordance with the present invention, in an acoustic structure for use as a sound insulator in a jet engine, where the engine has a sound-absorbing compartment enclosed by a perforated sound-absorbing wall.

The structure of the invention includes a framework adapted to be held within the compartment, and an acoustical insulation material disposed within the framework, with a sound-absorbing face of the material facing the jet engine sound-absorbing. The material is composed of a rigid matrix of randomly oriented, fused silica fibers having fiber diameters predominantly in the range 2–8 µm. The matrix is characterized by (i) a three-dimensionally continuous network of open, intercommunicating voids, (ii) a flow resistivity between about 10–200K rayls/m, and (iii) a density of between about 2 and 8 lb/ft3. A preferred flow resistivity is between 10–100K rayls/m, and a preferred density is between 2–5 lb/ft$^3$.

In one embodiment, the framework includes a honeycomb lattice of open cells, and the insulation material is carried in the cells, either completely or partially filling the cells. The insulation material may have a lower-to-higher flow resistance gradient, progressing in a direction from the sound-absorbing to the back face of the material.

The framework may include two or more open-cell lattices of this type arranged in a stacked configuration. The insulation material contained in the lattice forming the sound-absorbing face of the structure is preferably lower than that of the material contained in the lattice forming the back face of the structure.

Alternatively, the framework may include spacer elements adapted for placement in the sound-absorbing compartment, with the insulation material being disposed in the compartment between adjacent spacer elements.

In another aspect, the invention includes a method of reducing the level of sound in a jet engine having a sound-absorbing compartment formed by a perforated sound-absorbing wall and a solid back wall, and containing one or more open-face lattice cells. The method includes filling the lattice cells, at least partially, with an acoustical insulation material of the type described above.

The cells of the lattice may be partially or completely filled with the insulation material, and the insulation material in the partially filled cells may be distributed so as to create a spectrum of different compartment resonance lengths oriented in a direction normal to the cells' open faces.

Where the framework includes two or more such open-cell lattices in a stacked arrangement, the insulation material contained in the lattice forming the sound-absorbing face of the structure is preferably lower than that in the lattice forming the back face of the structure.

More generally, the invention provides a method of absorbing sound by placing in the path of the sound, an insulation material composed of a rigid matrix of randomly oriented, fused silica fibers having fiber diameters predominantly in the range 2–8 µm. The matrix is characterized by (i) a three-dimensionally continuous network of open, intercommunicating voids, (ii) a flow resistivity between about 10–200K rayls/m, and (iii) a density of between about 2 and 8 lb/ft3. A preferred flow resistivity is between 10–100K rayls/m, and a preferred density is between 2–5 lb/ft$^3$.

Also contemplated herein is a clad acoustical structure for use as sound insulator in a jet engine. The structure includes an acoustic insulation material of the type described above, having a sound-absorbing face and a back face, a solid composite ceramic material fused to the back face of material, and a perforated composite ceramic cover attached to the sound-absorbing face of the material.

These and other objects and features of the invention will become more fully apparent when the following detailed description of the invention is read in conjunction with the accompanying drawings.

DETAILED DESCRIPTION OF THE INVENTION

I. Sound-Insulation Structure with Internal Framework

Figure 1:
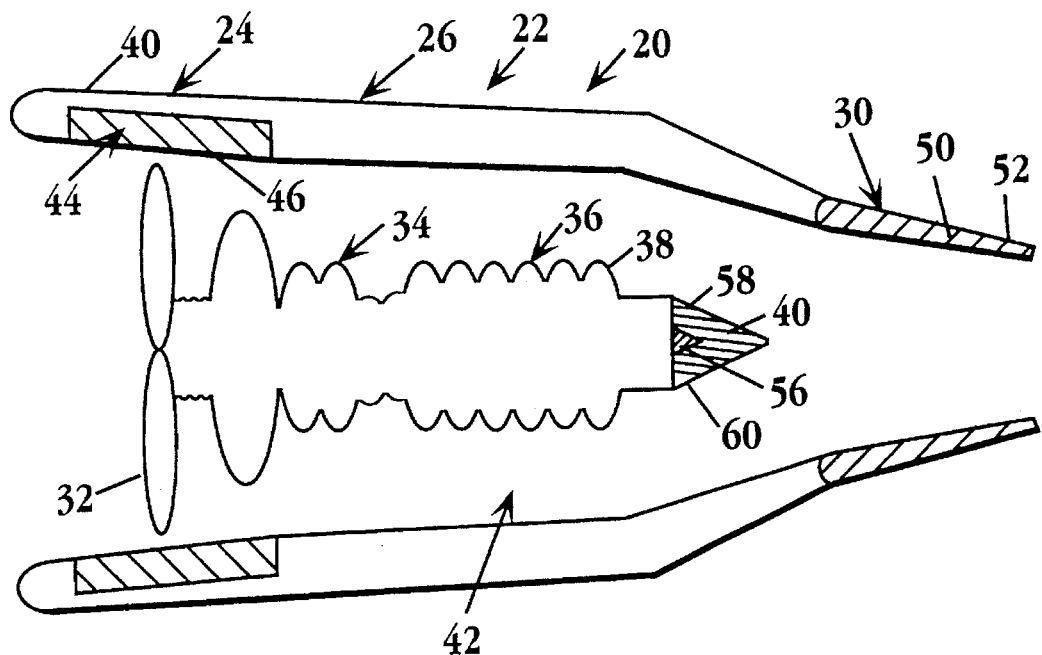
FIG. 1 is a simplified through-section view of a jet engine.

This section describes a sound-insulation structure for use as a sound attenuator, i.e., sound insulator in a jet engine. FIG. 1 shows a through-section view of a turbofan engine 20. This figure will be used to represent the regions of a turbofan engine which is sound insulated by the structure of the invention.

Referring to the figure, a generally annular engine housing or cowling 22 includes, in an intake-to-exhaust direction, an intake cowling section 24, an engine cowling section 26, and an exhaust nozzle 30. The turbofan engine conventionally includes intake fans, such as fan 32, a compressor 34, a combustor 36, turbine fans, such as fans 38, and an exhaust cone 40. The duct formed between the engine and cowling defines the engine's bypass duct 42.

Sound insulation in the engine is required primarily in the intake cowling section, the exhaust nozzle, and in the exhaust cone, as shown by the shaded portions in FIG. 1. The sound-insulating regions in the engine take the form of annular compartments, each defined by a perforated sound absorbing wall facing the source of sound in the engine, and a opposite, solid back wall. In the intake cowling section, the sound-absorbing compartment, indicated at 44, is formed by a perforated sound-absorbing wall 46 and a back wall 48, and is enclosed by the sound-absorbing wall. A sound-absorbing compartment 50 in the exhaust nozzle is formed by a perforated sound-absorbing wall 52 and a back wall 54. The exhaust cone's sound-absorbing compartment, indicated at 56, is formed between sound-absorbing wall 58 and a back wall 60.

In one general embodiment of the invention, described in Part A with respect to FIGS. 2–6, the framework is a metal lattice of open cells, and the cells are at least partially filled with the insulation material. In a second general embodiment, described in Part B with respect to FIG. 7, the framework includes support members or spacers placed within the sound-absorbing compartment, and the insulation material is disposed between the support members in the compartment.

A. Structure with Lattice Framework

Figure 2:
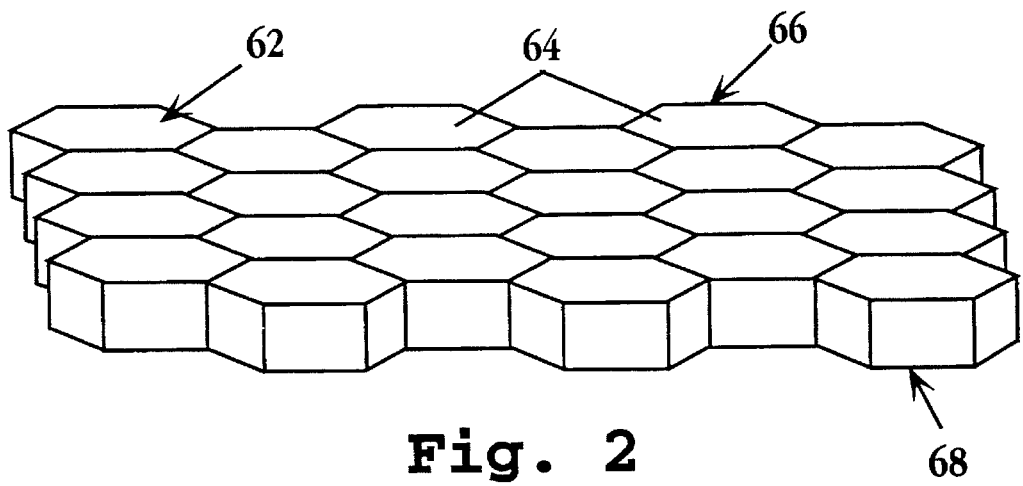
FIG. 2 shows a portion of a honeycomb lattice which forms the framework in an insulator structure constructed according to one embodiment of the invention.

FIG. 2 shows a honeycomb or lattice 62 of the type commonly employed for sound attenuation in a turbofan engine compartment. As seen, the lattice is composed of a network of open cells, such as cells 64, extending between upper and lower lattice faces 66, 68, respectively. The lattice may be constructed according to known methods e.g., as detailed in U.S. Pat. No. 4,465,725, and related U.S. Pat. Nos. 4,318,453 and 4,379,191. The dimensions of the lattice cell may be such as to absorb, i.e., dissipate, sound in a selected frequency range between 500 to 6,000 Hz. The lattice is typically composed of metal, but may be composed of a polymer resin at the engine intake cowling section, where temperatures typically do not exceed 400° F. or may be composed of a ceramic materials, particularly for use in the exhaust nozzle and cone of the engine, where it may be desirable, for purposes of engine thrust and size, to reach temperatures in excess of 1,500° F.

As employed in the prior art, a group of such lattices is stacked together to form an annular stack of lattices (not shown) which are dimensioned to extend between the two walls defining the corresponding sound-absorbing compartment of a jet engine. Typically, the lattices are separated by a microporous sheet that allows sound penetration from one lattice into another, and the two outer, exposed faces of the group of lattices are bonded to the compartment walls, as described in U.S. Pat. No. 4,465,725. Also as employed in the prior art, the lattices in the stack are preferably designed to dissipate the different peak sound frequencies in a jet engine, to provide sound attenuation of highest-energy sound frequencies. A stack of lattices of this type may contain 5–6 stacked annular lattices.

Figure 3:
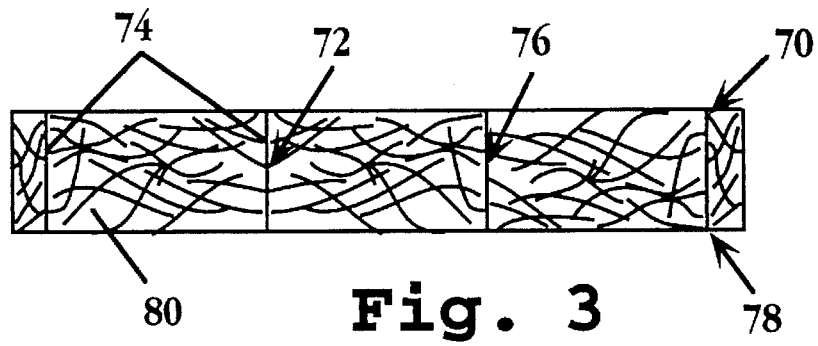
FIGS. 3–5 are sectional views through portions of honeycomb insulator structures formed in accordance with various embodiments of the invention.
Figure 4:
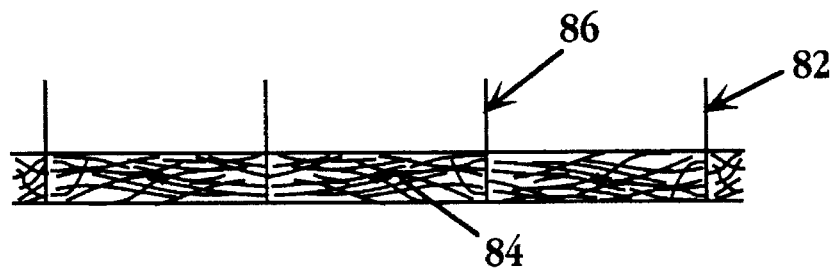
Figure 5:
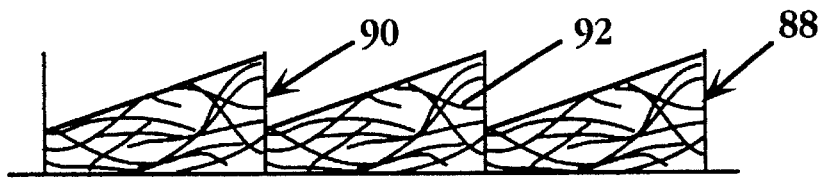

In the present invention, a lattice of open cells, such as exemplified in FIG. 2, forms the framework of an acoustical insulation structure which also includes a low-density sound-insulation material of the type described above at least partially filling the lattice cells. FIGS. 3–5 illustrate various configurations of the structure. Each figure illustrates a portion of a lattice cross-section, showing three cells of the lattice, and the disposition of sound-insulation material in each cell.

FIG. 3 shows an acoustic insulation structure 70 whose framework is a lattice 72 of open cells, such as cells 74. The lattice has a sound-absorbing face 76 defined by the upper edges of the cells, and a back face 78 defined by the opposite cell edges. The cells are substantially completely filled with the insulation material, indicated at 80. The cell thickness, and therefore the thickness of the material in the cells, is determined by the frequency of the absorbed sound. For bulk absorber applications, the preferred thickness is about ¼ of the wavelength of the lowest frequency sound to be absorbed. The material thickness should be at least 1/10 inch for fabrication and handling purposes.

To form structure 70, a fused fiber block or panel of insulation material is constructed as detailed below, and pressed, e.g., by machine pressing, into one of the two lattice faces. In this procedure, the lattice edges serve to partition the block into individual pieces that are wedged tightly into each cell.

In the acoustical structure shown in FIG. 4, the cells in the lattice, such as cells 82, are only partially filled with the ceramic insulation material, indicated at 84. As above, the thickness of the material in each cell is preferably at least 1/10 inch for machining and handling purposes. Quarter wavelength thicknesses are about ½ and 6 inches for 6,000 and 500 Hz sound frequencies, respectively, where the insulation material is a bulk absorber. Where the material is contained in a lattice cell, the material thicknesses effective to absorb sounds in this frequency range may be much less, e.g., 1/10 inch or greater.

In forming this structure, a reduced thickness block, constructed as described below, is wedged into the lower face of the structure's lattice 86 until the block segments are tightly held in the lattice cells. As will be discussed below, the block may have a uniform density and flow-resistivity throughout, or a density gradient leading to lower flow resistivity at the sound-absorbing face of the material, and higher flow resistivity at the back side of the material.

FIG. 5 shows a sound-insulation structure 88 whose lattice cells, such as cells 90, are each filled with a gradient of material, such as material 92, increasing in depth across each cell in the dimension shown. The gradient surface of material in each cell forms a continuum of different cell depths, i.e., different thicknesses in a direction normal to the lattice face, for damping sound frequencies over a broad frequency range.

To form the structure shown in FIG. 5, a block having the thickness of the lattice cells is machined to produce the localized gradients in the block surface. The machined block is then pressed and partitioned into the lattice, as above.

Figure 6:
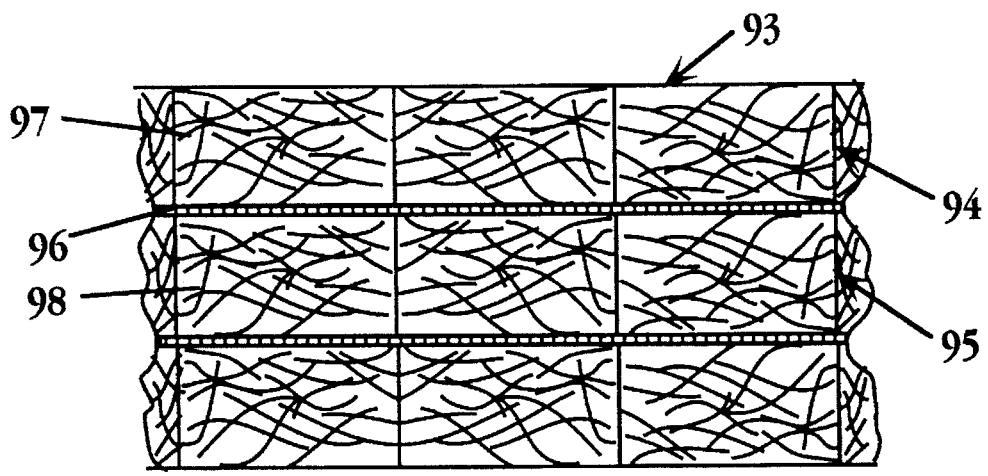
FIG. 6 is a cross-sectional view of a stacked-lattice acoustical insulation structure formed in accordance with the invention.

FIG. 6 shows a structure 93 having multiple open-cell lattices, such as lattices 94, 95 in a stacked configuration, where each lattice is separated by a microporous sheet, such as sheet 96, that allows sound penetration from the back face of one lattice to the sound-absorbing face of an adjacent lattice. In this structure, the sound insulation material contained in each lattice, such as material 97 in the open cells of lattice 94, and material 98 in the open cells of lattice 95 may have a different mean pore size and flow resistivity.

In particular, it is desired to have a relatively low flow resistivity (larger mean pore sizes) at the sound-absorbing side of the stacked structure, i.e., in the lattice forming the sound-absorbing face of the structure (the upper face in the figure) for efficient sound absorption, and higher flow resistivity (lower mean pore sizes) in material contained in the lattice forming the back of the structure (the lower lattice in the figure). The intermediate lattice may contain insulation material with an intermediate flow resistivity. In this way, the stacked configuration can contribute to a higher ratio of absorbed to dissipated sound.

Thus, for example, in a three-lattice structure, one lattice may contain material having a flow resistivity of in the range 20–50K rayls/m, a second lattice having a flow resistivity in the range 40–100K rayls/m, and a third lattice, material having a flow resistivity between 70–200K rayls/m. Methods for producing such material are considered in Section III below.

The stacked configuration also contributes to sound attenuation by providing a greater total material thickness. As mentioned above, greater material thickness is effective in absorbing lower-frequency sounds. Although each of the lattices shown in the figure may have the same thickness, it may be desirable, for improving the ability of the structure to absorb sound, particularly at lower frequencies, to have differing lattice thicknesses.

In the multi-lattice structure just described, the number and/or thickness of the lattices may be substantially reduced, when compared to lattice stacks employed in the prior art, because of the ability of the insulation material to absorb and dissipate sound effectively over a broad frequency range, as just discussed.

B. Structure with Spacer Framework

In another general embodiment, the sound-absorbing wall(s) enclosing the sound-absorbing compartment of the engine are supported internally by spacer or support members, which form the framework of the insulating structure, and the insulation material is disposed between the support members.

Figure 7:
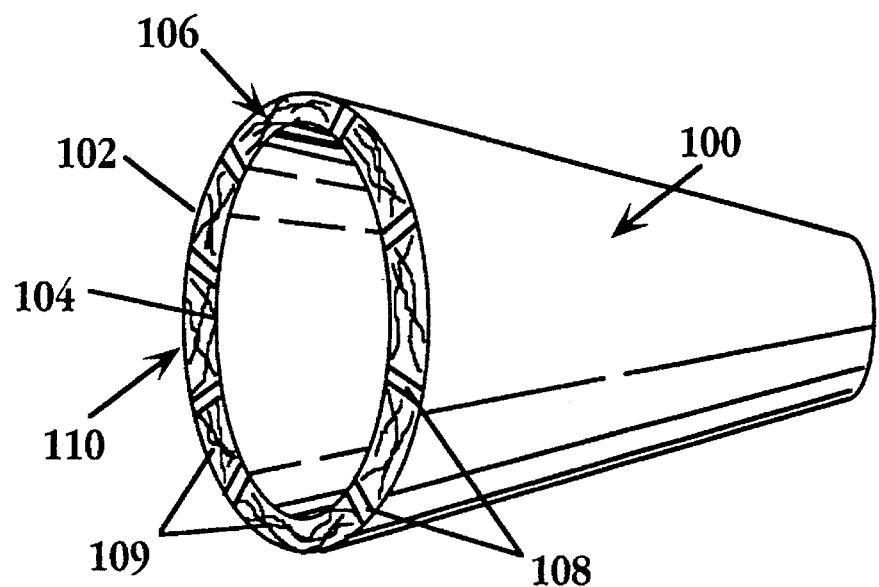
FIG. 7 is a sectional view through an exhaust nozzle containing a sound-absorbing structure constructed according to another embodiment of the invention.

FIG. 7 shows an engine exhaust cone 100 provided with sound-insulation structure of this type. The cone includes an outer perforated sound-absorbing wall 102 and an inner solid wall 104. The two walls define a sound-absorbing compartment 106 having a plurality of spacer elements, such as elements 108, which provide internal support between the two walls. The supports, which may metal or other structural material, extend longitudinally, converging at the cone vertex.

Disposed between each pair of spacers is a wedge-shaped panel, such as panels 109, formed of the insulation material of the invention. The panels are dimensioned to be completely fill the compartment space between the two compartment walls and adjacent spacers, to hold the panel securely in place within the cone. The panels, such as panels 109, and spacers, such as spacers 108, collectively form a sound-insulation structure 110 in accordance with the invention.

To construct the sound-absorbing structure, ceramic sound-insulation material having the properties described below are constructed as described in Section III. The material, which is typically prepared in flat or curved panels, is machined to produce the desired wedge shape and thickness. The panels are then pressed into the wedge-shaped spaces formed in the cone.

As with the lattice structure described above, the present structure functions as a sound insulator by absorbing and dissipating sound from the high-velocity gases as these pass over the perforated sound-absorbing wall covering the structure. Also as above, the panel thickness is preferably about ¼ of the wavelength of the lowest frequency sound to be absorbed, and at least about 1/10 inch, as discussed above.

In the embodiments of the invention described thus far, the back wall of the sound-absorbing compartments serves as a barrier to prevent the escape of sound through the compartment. Where, as here, the interior of the sound-absorbing compartment faces the engine axis, no such barrier is required. Thus, for example, the cone structure shown in FIG. 7 could be modified to fill a conical compartment formed only of an outer conical perforated plate or wall, with the insulation material completely filling the conical interior. This structure, which is formed in accordance with yet another embodiment of the invention, includes internal structural supports attached to the perforated plate and serving as structural supports for the insulation material.

C. Material Microstructure

FIGS. 8A–8D are scanning electron microscopy (SEM) photomicrographs of a fused-fiber matrix 112 making up acoustical sound-absorbing material in the structure of the invention. The matrix is composed typically of 60–100% by weight silica fibers and 0–40% by weight alumina fibers. In the embodiment shown the matrix is composed of 80 percent of fiber weight of silica fibers and 20 percent by fiber weight of alumina fibers. A matrix of this type will be referred to herein as a fused-silica matrix, it being recognized that the matrix is composed of silica fibers or a composite of silica and alumina fibers fused with one another, typically above 2,000° F.

Figure 8A:
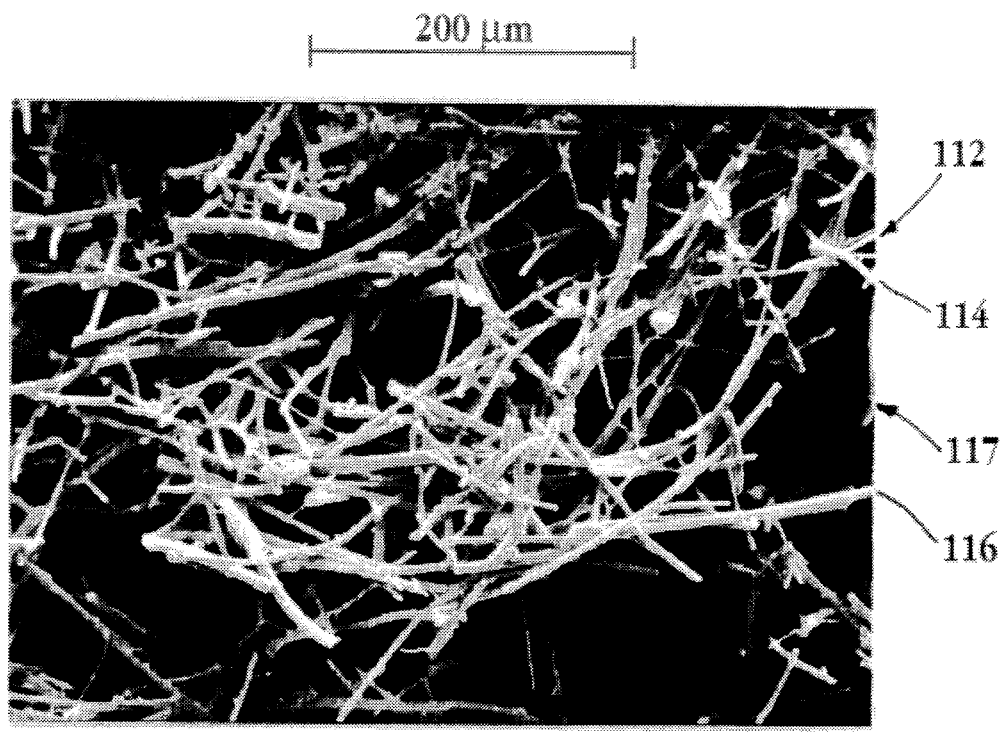
FIGS. 8A–8D show scanning electron micrographs of acoustical insulation material used in the invention, taken at magnifications of 220 (8A), 1,000 (8B), 3,000 (8C), and 7,000 (8D)
Figure 8B:
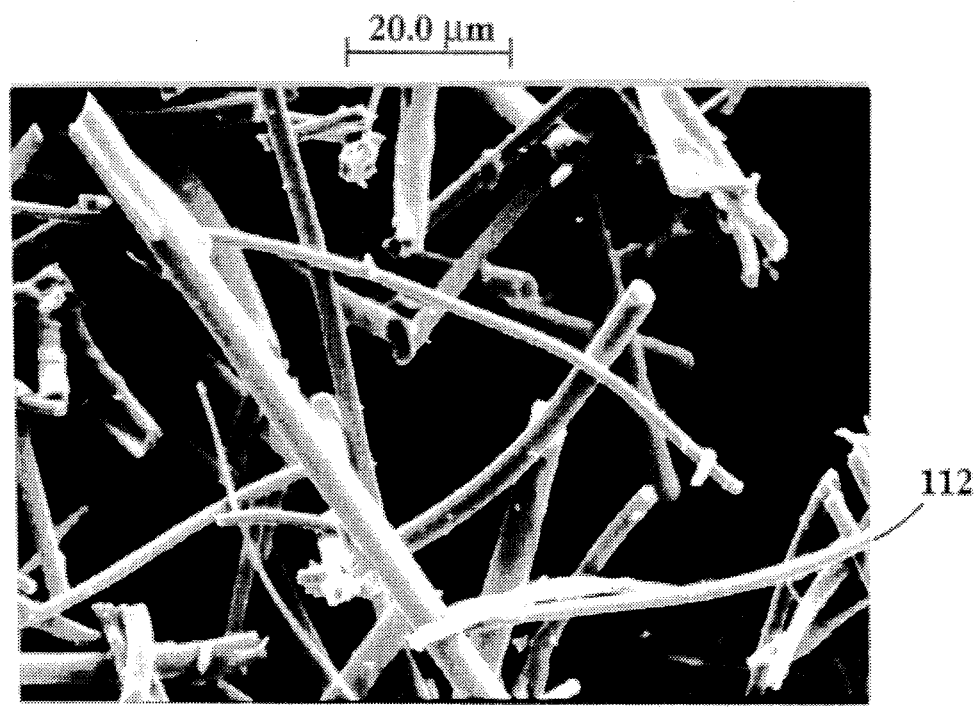

The figures are electron micrographs of the matrix taken at 200× (8A), 1,000× (8B), 2,000× (8C), and 7,000× (8D) magnification. The portion of the matrix in FIG. 8A shows a "nest" of fused silica and alumina fibers, such as fibers 114, 116, respectively, ranging in size from about 200 μm to 10 mm in length. The higher magnification SEM micrograph seen in FIG. 8B shows how the fibers are fused at their points of intersection to form a rigid fiber structure having 3-dimensionally continuous network of interconnecting voids or pores, such as pores 167, which tend to have "long" (uninterrupted) dimensions between about 10–1,200 μm, and short "width" dimensions between about 0.1 to 20 μm. That is, the fused fibers are substantially randomly oriented, forming in all directions, interconnecting pores defined by groups of fused fibers, where the pores can range in size between about 0.1 to 1,200 μm depending on pore orientation and distance between adjacent fibers.

The 2,000× magnification micrograph (FIG. 8C) clearly shows both silica fibers, which are smooth surfaced, and alumina fibers, which have a textured or mottled surface. The silica fibers in the matrix, which constitute the predominant fiber species, preferably 60–100 weight percent, have fiber diameters predominantly in the 2–8 μm size range. The alumina fibers, which preferably constitute between 10 and 40 weight percent of the matrix, may have sizes in the same range, or as shown here, larger fiber diameter sizes, e.g., 2.5-3.5 μm.

The mottled regions on the alumina fibers presumably represents grain growth that occurs during the high-temperature sintering step used in forming the matrix. Clearly visible in FIG. 8C are fusion junctions between two silica fibers, such as junction 118; fusion junctions between silica and alumina fibers, such as junction 120 between silica and alumina fibers; and fusion junctions, such as junction 122 between two alumina fibers.

Figure 8C:
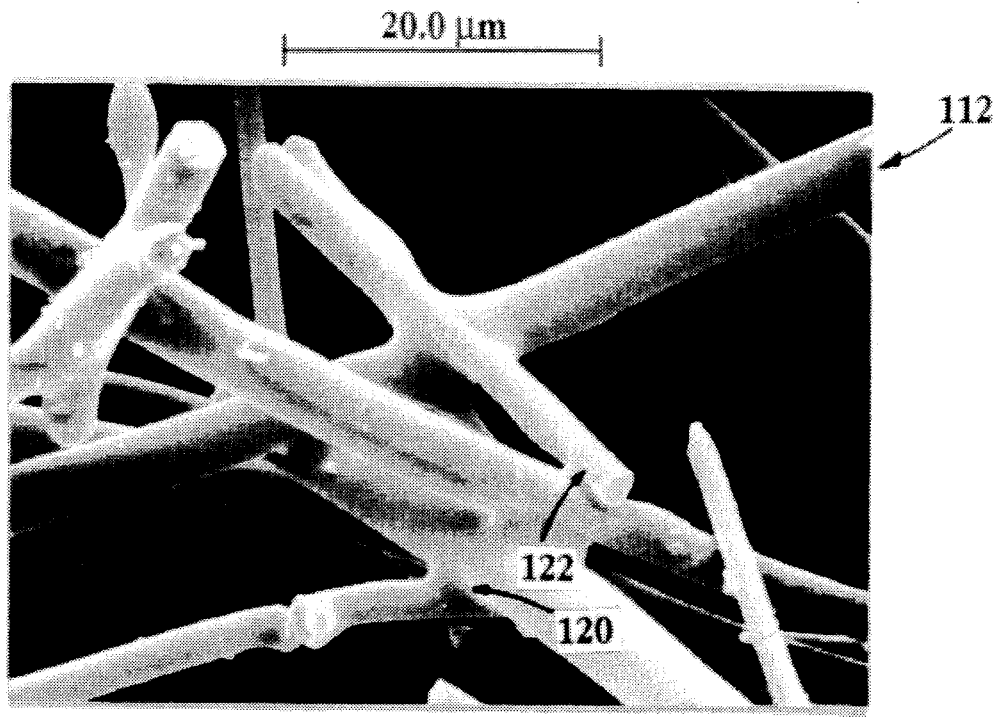
Figure 8D:
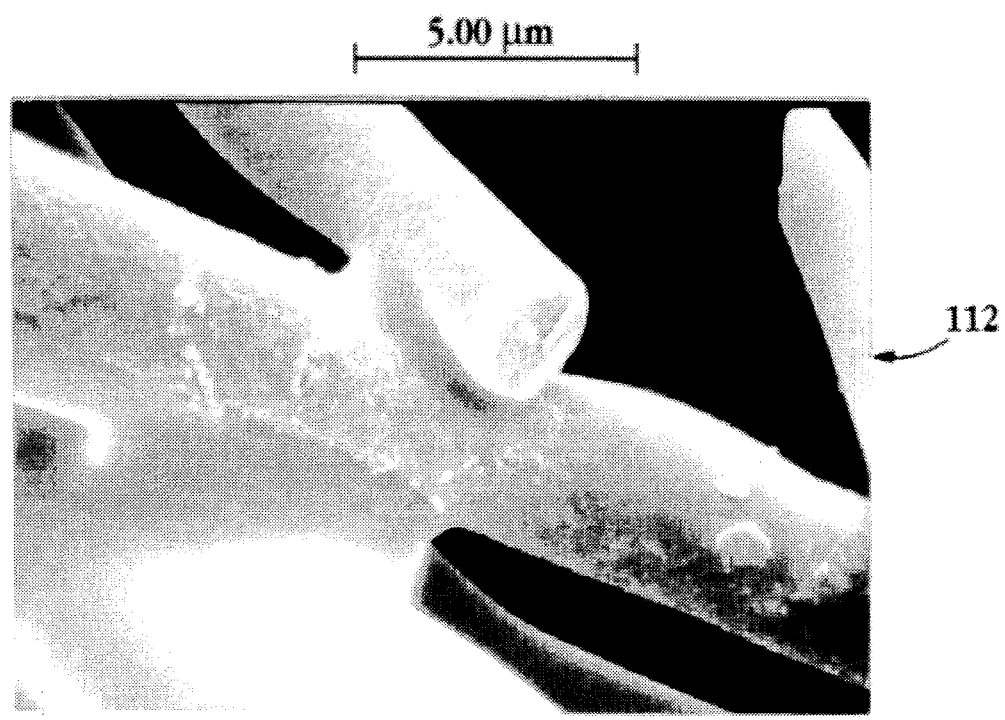

The junction region at the lower center in FIG. 8C is shown at 7,000× magnification in FIG. 8D. The micrograph shows more clearly the textured grain-growth regions of the alumina fibers, and both silica/alumina and alumina/alumina fiber junctions.

D. Properties of the Sound-insulation Material

The acoustical sound-insulation material of the invention is designed to provide (i) a flow resistivity at its sound-absorbing surface which allows efficient sound absorption into the matrix, (ii) a broad range of pore sizes which favor sound absorption over a broad frequency range, and (iii) ability to dissipate absorbed sound due to the rigid-fused fiber construction and high strength of the matrix.

In one general embodiment of the invention, the material has a relatively low flow resistance at both panel sides and a relatively uniform flow between panel sides. The flow resistance at both panel sides is preferably between about 10–200, K rayls/m, with 20–100K rayls/m being a preferred range. Alternatively, the flow resistance between the sound-absorbing and back faces of the material may increase in a gradient fashion, typically due to a lower-to-higher density gradient on progressing from the sound-absorbing to the back side of the material. Methods for controlling the extent of such gradient in the manufacture of the insulation material are considered in Section III below.

Also as noted above, a multi-lattice structure constructed in accordance with the invention may have insulation material with different mean pore sizes and flow-resistivities in each of two or more stacked lattices, to broaden the sound-frequency range over which sound is absorbed efficiently.

Figure 9:
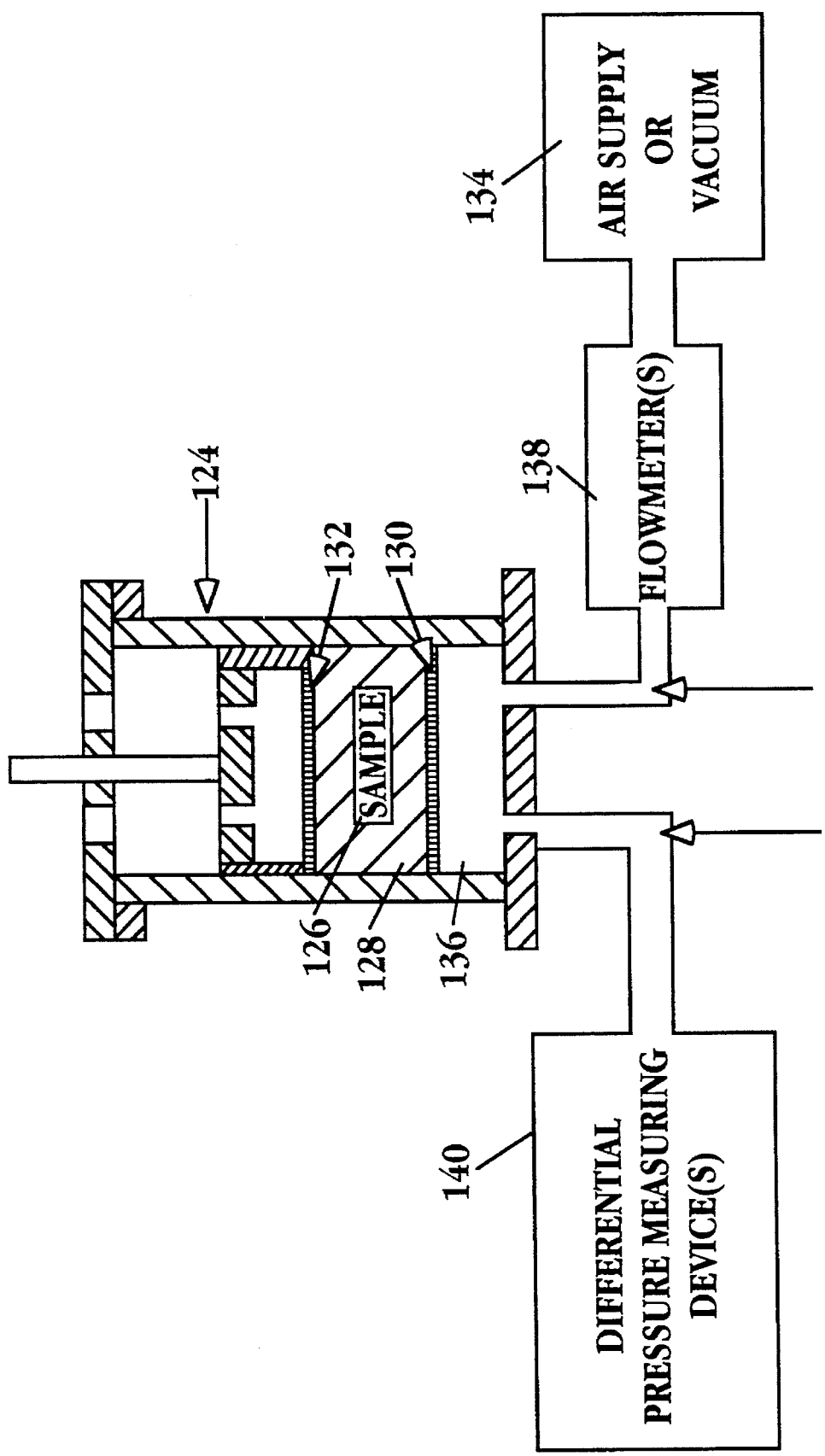
FIG. 9 illustrates a method for measuring air flow resistance in an acoustical material.

FIG. 9 shows a device 124 for use in measuring the flow resistance of a sample, here indicated at 126. The device includes a sample chamber 128 for holding the sample between a pair of screens 130, 132. An air supply or vacuum source 134 pumps air into or evacuates air from, respectively, a lower region 136 of the chamber. The rate of air flow between chamber region 136 and source 134 is measured by a flowmeter 138. Chamber region 136 is also in fluid communication with a differential pressure measuring device 140 which measures the pressure differential across the sample.

In operation, source 134 is adjusted to a desired pressure or vacuum level. The resistivity of the sample in the sample chamber is then measured from the pressure differential across the sample and the rate of flow through the device, with high pressure differential measurements and low flow rates being associated with high resistivity, and low pressure differential and high flow rates being associated with low resistivity.

Figure 10:
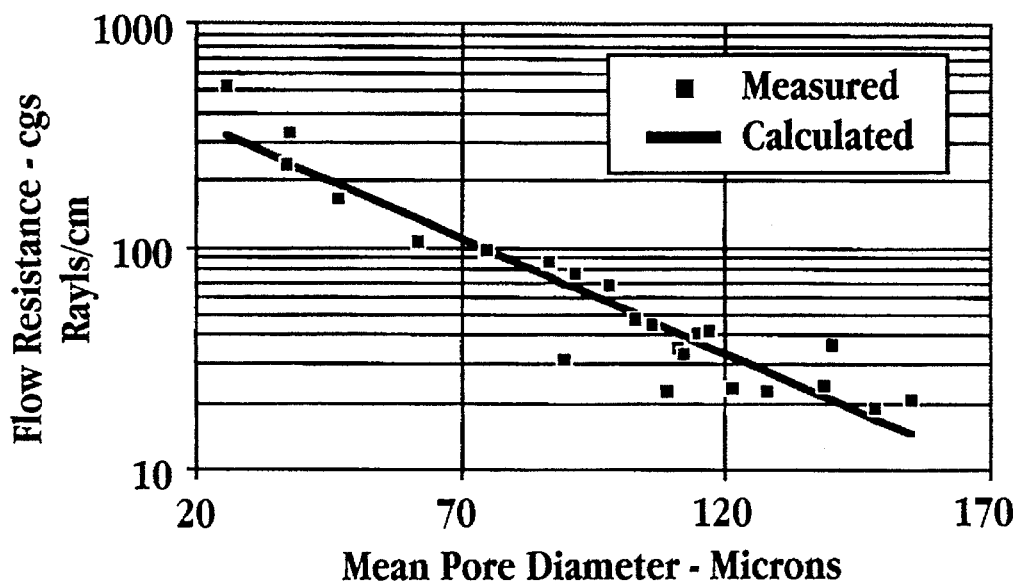
FIG. 10 is a plot showing the relationship between air flow resistance in acoustical material constructed in accordance with the invention as a function of mean matrix pore size.

FIG. 10 shows the relationship between flow resistivity and mean pore size in a sound-insulation material constructed in accordance with the invention. The material matrices examined were formed to have varying bulk densities and/or fiber diameters, as discussed in Section III below. Mean pore size of each matrix was determined by percent intrusion of mercury into a matrix, as a function of mercury intrusion pressure, measured using a Micromeretics PoreSizer 9320 mercury porosimeter. Sample sizes with dimensions of 0.5625 inch diameter by 0.4 inch height were cored from a fused matrix formed in accordance with the invention. The intrusion pressure was varied from 0.15 to 30 psi×A (area=1 in$^2$), with 85 or more points of increasing pressure. From this data, a instrument program calculated the incremental volume (ml/g) intruding into the sample. An internal program is used to calculate a pore diameter in microns for a given pressure level. From this, the mean pore diameter for the sample is determined.

As seen, flow resistance increases logarithmically with decreasing mean pore size over a mean pore size range of about 20–150 μm, with the desired flow resistance in the range between 10–200K rayls/m corresponding to mean pore sizes in the range of about 40–170 μm or less.

Figure 11:
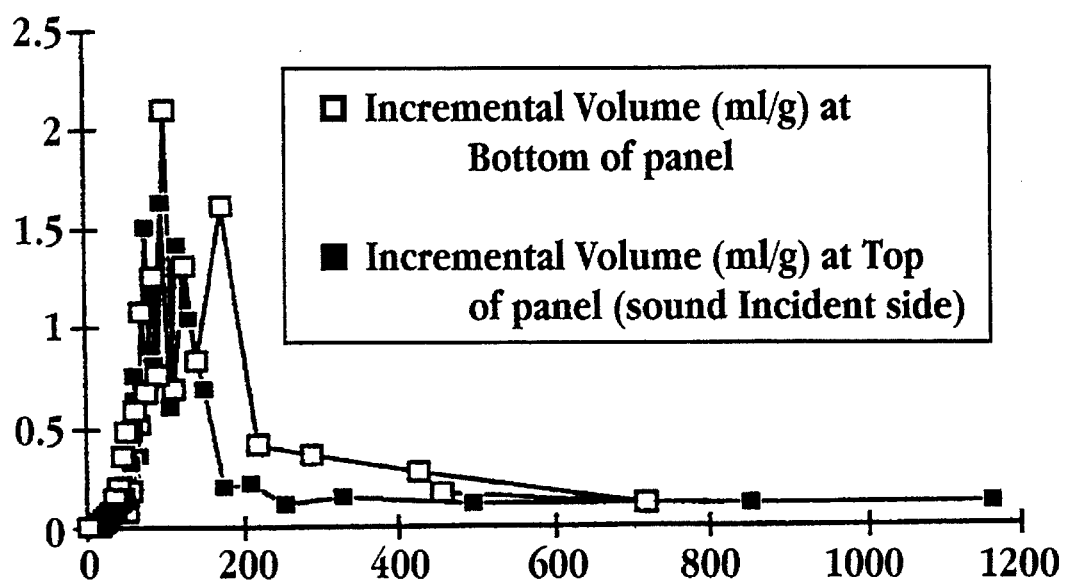
FIG. 11 shows the pore size distribution measured at the sound-absorbing side (open squares) and at the back side (closed squares) of sound-insulation material constructed in accordance with the invention.

FIG. 11 shows the distribution of pore sizes in a sound-absorbing material constructed in accordance with the invention, and in particular, a matrix having a shallow density gradient progressing from the panel's sound-absorbing to its back side, such that mean pore size at the matrix' sound-absorbing side is somewhat greater than at the back side.

As described above, the pore size distribution is determined from the extent of Hg intrusion into a defined-area surface of the panel, at each of a number intrusion pressure from about 0.15 to 30 psiA.

For the sound-absorbing side of the panel, pore sizes ranged from about 0.1 to 700 μm, with a mean pore size of 97 μm. With reference to FIG. 10, this mean pore size corresponds to a flow resistivity of about 60–70K rayls/m. For the back panel side, pore sizes ranged from about 0.1 to 1150 µm, with a mean pore size of about 87 µm, corresponding to a flow resistivity of about 80K rayls/m. These measurements illustrate how a flow resistivity gradient in a panel constructed in accordance with the invention can be demonstrated.

According to another feature of the material, the wide range of pore sizes is effective to absorb sound over a broad range of frequencies, e.g., in the 100–5,000 Hz range. As already noted, the range of pore sizes in the material of the invention is between about 0.1 to 1,000 µm.

Once absorbed, sound waves of a particular frequency are deflected and dissipated by the randomly oriented, fused silica fibers. In particular, the rigid, randomly oriented network of fibers, acts to dampen sound waves by localized vibrations within the matrix.

To be effective in dissipating absorbed sound, the bulk material also has a thickness of preferably about one-quarter wavelength of the lowest frequency sound to be absorbed. This is to insure that some portion of the wave having high particle velocity is within the dissipative medium.

The ability of the panel material to dissipate absorbed sound also depends on material stiffness, due to the fused-fiber construction of the material. One measure of material stiffness is compression modulus, which provides a measure of the material resistance to deformation under a compressive force, measured according to standard methods. The compression modulus of the panel matrix is preferably between 100 and 2,500 psi.

With reference again to FIGS. 3–7, it can be appreciated how the sound-insulation structures in panel of the invention acts to attenuate aircraft jet engine noise. In the embodiments shown in FIGS. 3–7, which are preferred embodiments for providing sound insulation in the intake cowling section and exhaust nozzle or cone of an engine, sound from the engine and carried by air and heated gases in the engine's bypass duct passes through the corresponding-compartment perforated, sound-absorbing plates, where it is absorbed by the sound-insulation face of the insulation material. As the absorbed sound travels through the material, it is largely dissipated by virtue of the panel thickness and stiffness, and the randomly oriented fused-fiber construction, as discussed above. In the embodiment shown in FIG. 6, the material contained in the different lattices is designed to have a reduced flow resisitivty at the sound-absorbing face of the structure, with increased flow resistivity progressing toward the back of the structure, and a total material thickness effective to provide sound dissipation over a desired frequency range.

Similarly, for the structure shown in FIG. 7, which is one preferred embodiment in the engine exhaust cone, engine noise carried in the hot gases moving out of the engine pass through the perforated plate in the cone, and are absorbed and dissipated in the cone insulation panels.

In addition to their sound-insulation properties, the structures of the invention are also advantageous because of (i) high material strength and integrity, (ii) low density, (iii) resistance to high engine temperatures; and (iv) low coefficient of thermal expansion.

The material strength, as indicated above, is due to the fused-fiber construction, which interlocks the matrix fibers into a stiff, unitary block. The high material strength and integrity is required to for supporting the material in the structure framework, and for resisting material breakdown, particularly in view of the vibrations and high gas speeds the material is exposed to during jet operation.

The low density of 2–8 lb/ft³, and preferably 2–5 lb/ft³, is needed to achieve reduced engine and aircraft weight. In particular, the low density is advantageous in achieving superior sound-insulation, preferably also achieving an overall reduction in weight, due to the reduced number and/or total thickness of lattices that are employed.

The sound-insulation material is able to withstand temperatures up to 1,800° F. or higher, and is thus suitable for use even in the engine nozzle and cone regions exposed to expelled hot jet gases. At the same time, the low coefficient of thermal expansion minimizes stress and deterioration of the sound-insulation material over time.

In a related aspect, the invention includes a method for reducing the level of sound in a jet engine having a sound-absorbing compartment formed by a perforated sound-absorbing wall and a solid back wall and, disposed within the compartment, a honeycomb lattice of open-face cells. The method includes filling the lattice cells, at least partially, with an acoustical insulation material of the type just described. The lattice cells may be completely filled with the insulation material, or partially filled, such as in the gradient configurations shown in FIG. 5.

More generally, the invention provides a method of absorbing sound by placing in the path of the sound, an insulation material composed of a rigid matrix of randomly oriented, fused silica fibers having fiber diameters predominantly in the range 2–8 µm. The matrix is characterized by (i) a three-dimensionally continuous network of open, intercommunicating voids, (ii) a flow resistivity between about 10–200K rayls/m, and (iii) a density of between about 2 and 8 lb/ft3. A preferred flow resistivity is between 10–100K rayls/m, and a preferred density is between 2–5 lb/ft³.

II. Clad sound-Insulation Structure

In another aspect, the invention includes a clad acoustical ceramic structure for use as a sound insulator in a jet engine, particularly where engine temperatures above 1,500°–1,800° F. are encountered, as is expected in new high-thrust engines.

Figure 12:
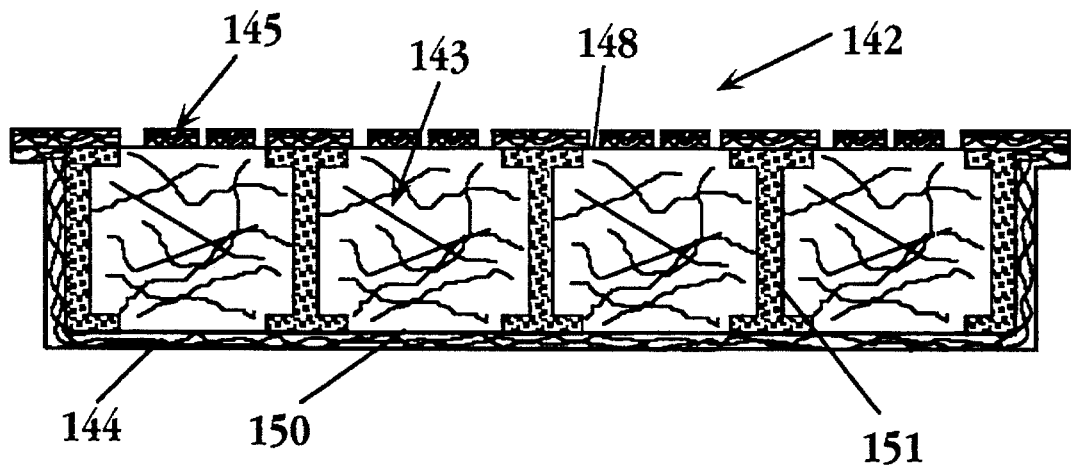
FIG. 12 is a perspective, cutaway view of a ceramic clad acoustical structure constructed according to another embodiment of the invention.

A clad structure 142 constructed in accordance with the invention, illustrated in cross-section in FIG. 12, includes a series of center blocks, such as block 143, of ceramic sound-insulation block material, a solid composite ceramic backing 144 fused to the back side of the material, and preferably to side regions of the block, as indicated, and a perforated composite ceramic cover 145 attached to the sound-absorbing side of the material, e.g., by fusion with backing 144.

Center blocks, such as block 143, which has a sound-absorbing side and back sides 148, 150, respectively, has the construction described above in Section I. Specifically, the block is composed of a rigid matrix of randomly oriented, fused silica fibers having fiber diameters predominantly in the range 2–8 µm. The matrix has (i) a three-dimensionally continuous network of open, intercommunicating voids, (ii) a flow resistivity between about 10–200K rayls/m, and (iii) a density of between about 2 and 8 lb/ft3, preferably 2–5 lb/ft³. Methods for constructing the block are detailed in Section III below.

The blocks are reinforced internally by a series of high-density ceramic I-beams type structures, such as structure 151, formed of a silica or alumina ceramic material and having a density of typically 50–180 lb/ft³. These I beam structures form a reinforcing framework of the structure.

The solid composite ceramic backing in the structure is preferably a woven fiber composite ceramic material formed by laying up continuous-weave layers of silica or alumina fibers, and interleaving these layers with a silica or alumina resin, where the woven layers have different fiber orientations to produce high composite strength. The material can be prepared in a green-state at relatively low temperatures, e.g., 250°–1,000° F. Green-state composite laminates of this type may be obtained, for example, from Hexcel (Pleasanton, Calif.) or from Allied Signal, or may be prepared as above, from silica- or alumina-weave material, and silica or alumina resin obtained from the same sources.

Similarly, the ceramic cover is formed of a silica or alumina composite laminate formed by interleaving continuous weave silica or alumina woven layers with silica or alumina resin, perforating the composite, then forming a desired green state laminate by low-temperature curing.

To produce the clad structure, a fused-fiber block of insulation material is machined to be pressed into engagement with the solid I-beam structures, which are also in a fused state. The reinforced block is then coated at its lower and side faces with a silica or alumina resin, and covered over these surfaces with a green-state solid weave laminate, as shown. The upper block surface is laid over the block's upper face, with resin bonding to the I-beam edges, and at edge regions of overlap with the backing laminate as shown, and the entire structure is then fused into a solid, unitary structure by high-temperature heating, e,g, 2,000° F. or above.

The clad structure is designed for use as a sound-insulating structure for a turbofan or turboprop engine, as above, but where the two composite layers in the structure serve as the sound-absorbing wall and back wall or a sound-absorbing compartment in the engine. In particular, the structure may be prepared in a conical form for use as an engine cone to dampen engine exhaust gases, similar to the structure shown in FIG. 7, but where the two walls formed the engine compartment and the internal insulation material are formed as a unitary ceramic structure. In addition to reduced weight, the unitary structure is able to withstand operating temperatures between 1,500° and 1,800° F. and provides reduced nacelle construction.

III. Method of Panel Preparation

This section describes the preparation of the acoustic absorber panel of the invention, and in particular, one having a substantially uniform flow-resistivity between its sound-absorbing and opposite sides.

The basic preparation method involves the steps of (i) forming a fiber slurry having desired viscosity and fiber dispersion characteristics, (ii) allowing the slurry to settle under conditions that produce a selected fiber density and orientation, (iii) drying the resulting fiber block, and (iv) sintering the block to form the desired fused-fiber matrix.

A. Fiber Treatment

The silica ($SiO_2$) and/or silica ($SiO2$)/alumina ($Al_2O_3$) fibers used in preparing the matrix are available from a number of commercial sources, in selected diameters (fiber thicknesses) between about 2 and 8 μm, or smaller fiber sizes, e.g., 0.5–2 μm where a panel with a fiber-size gradient is produced, as described below. A preferred silica fiber is a high purity, amorphous silica fiber (99.68% pure), such as fabricated by Manville Corporation (Denver, Colo.) and sold under the fiber designation of "Q-fiber". High purity alumina fibers (average 2.5 to 3.5 μm) may be procured, for example, from ICI Americas, Inc. (Wilmington, Del.).

In a preferred heat treatment, the silica fibers are compressed into panels, e.g., using a Torit Exhaust System and compaction unit. The compressed panels are passed through a furnace, e.g., a Harper Fuzzbelt furnace or equivalent, above 2100° F. for a minimum of 60 minutes, corresponding to a speed setting of about 5.4 inches/minute. The heat treatment is used to close up surface imperfections on the fiber surfaces, making the matrix more stable to thermal changes on sintering. The heat treatment also improves fiber chopping properties, reducing fabrication time. The method is illustrated in Example 1, Part A.

B. Preparing a Fiber Slurry

Silica, and optionally including alumina fibers, from above are blended to form a fiber slurry that is used in forming a "green-state" block that can be sintered to form the desired matrix.

The slurry is formed to contain, in an aqueous medium, silica, or silica and alumina fibers of the type described above, at a fiber:liquid weight ratio of between about 1:20 to 1:200, where the liquid weight refers to the liquid weight of the final slurry preparation. For producing a panel with a uniform density gradient, a relatively low fiber:liquid ratio, e.g., 1:20–1:50 is preferred.

The slurry preferably includes a thickening agent effective to give the slurry a viscosity between about 500 and 7,500 centipoise, as measured by standard methods (Example 1). The viscosity agent may be any of a number of well-known hydrophilic polymers, such as polyvinylalcohol, polyvinylacetate, polyvinylpyrrolidone, polyurethane, polyacrylamide, food thickeners, such as gum arabic, acacia, and guar gum, and methacrylate type polymers. The polymers preferably have molecular weights greater than about 25–50 Kdaltons, and are effective to increase solution viscosity significantly at concentrations typically between about 2–50 weight percent (based on total fiber weight) solution. For producing a panel with a relatively uniform matrix density, a relatively high slurry viscosity is preferred.

One preferred thickening agent is Acrylic Acid Polymer, e.g., the polymer sold under the tradename Acrysol ASE-108 and available from Rohm and Haas Company (Philadelphia, Pa.). An acrylate solution used in the method is detailed in Example IB.

The slurry is also preferably formed to contain a source of boron that functions, during sintering, to form a boron/silica or boron/alumina surface eutectic that acts to lower the melting temperature of the fibers, at their surfaces, to promote fiber/fiber fusion at the fiber intersections. In a preferred embodiment, the boron is supplied in the slurry as boron nitride particles 15 to 60 μm in size particles. Such particles can be obtained from Carborundum (Amherst, N.Y.). The amount of boron nitride is preferably present in the slurry in an amount constituting between about 3–15 weight percent of the total fiber weight.

The adhesive property of the thickening agent described above is useful in adhering particles of boron nitride to the fibers in the slurry, to produce a relatively uniform dispersion of particles in the slurry, and to minimize the tendency of particles to settle out of the slurry during the molding process described below.

Fragments of the silica fiber are mixed in a desired weight ratio with alumina fibers, e.g., 0–40 weight percent alumina fibers, and the fibers are dispersed in an aqueous solution. The boron nitride and acrylate suspension is mixed into the slurry to bring the viscosity of the slurry to a desired value between 500–7,500 centipoise. Generally the slurry is not chopped, since a greater degree of chopping produces shorter fibers leading to tighter packing and a less open matrix.

Similarly, longer fibers lead to more open matrix structure and lower bulk densities.

The fiber mixing is preferably carried out under condition to produce average fiber sizes of a selected size in the 3–20 mm fiber-length range. After dispersing the fibers uniformly in the liquid medium, the acrylate stock solution and boron nitride suspension is added, then dispersed into the fiber slurry medium using a low shear mixer. The method is illustrated in Example 2A.

C. Forming a Dried Fiber Block

The method of forming a green-state block, i.e., a dried, rigid matrix of unfused fibers, from the above fiber slurry, is illustrated in FIGS. 13A–13D.

Figure 13A:
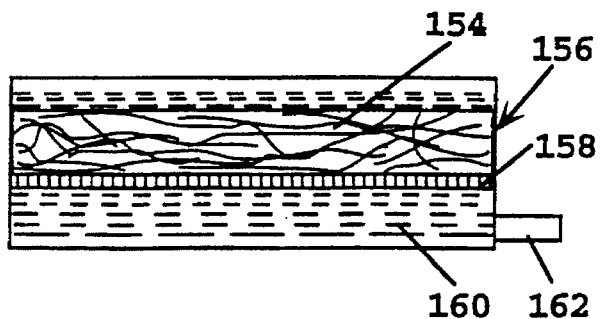
FIGS. 13A–13D illustrate steps in compacting a silica-fiber slurry, in preparing a green-state fiber block, for use in preparing an acoustical sound-absorbing material in accordance with the invention.

In the first step, illustrated in FIG. 13A, a slurry 154 is added to a mold 156 equipped with a lower screen 158 sized to retain slurry fibers. For fiber sizes (lengths) in the range 1–15 mm, the screen has a mesh size between about 8 to 20 squares/inch. The mold has a lower collection trough 160 equipped with a vacuum drain port 162.

A vacuum of between 4 and 28 inches of mercury is applied to the port. In forming a uniform-density block, it is desirable to employ a compression plate (not shown) placed over the slurry. The compression plate acts to compress the slurry from above, to achieve a relatively uniform fiber packing as the slurry is dewatered. Alternatively, where it is desired to accentuate a density gradient difference between sound-absorbing and back sides of the block, it is useful to promote fiber packing preferentially at the bottom of the mold, by applying only vacuum (without a packing plate).

Figure 13B:
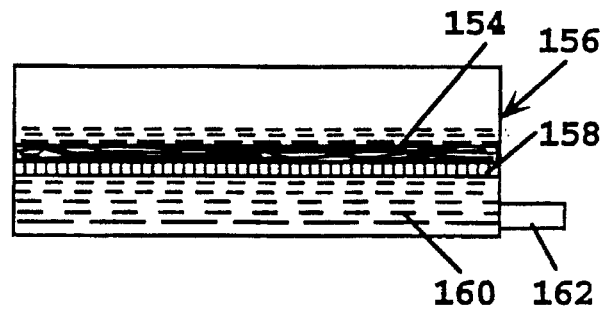

The vacuum is applied over a vacuum forming time, defined as the time required to reduce the slurry to the desired block height, and enough water is removed from the block so that standing liquid is removed from the top of the block, and the vacuum starts to pull air. A total vacuum forming time between about 5 and 180 seconds is sufficient to evacuate the water to form the desired block height, as illustrated in FIG. 13B.

Figure 13C:
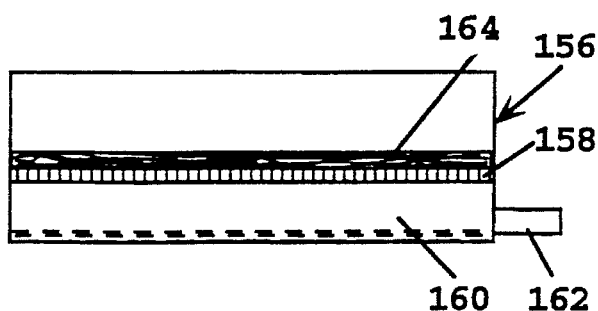

The complete vacuum dewatering process continues for 0.5 to 30 minutes after the vacuum forming time, until approximately 50% of the water is removed and/or little water is being drawn from the formed matrix, indicated at 164 in FIG. 13C.

Figure 13D:
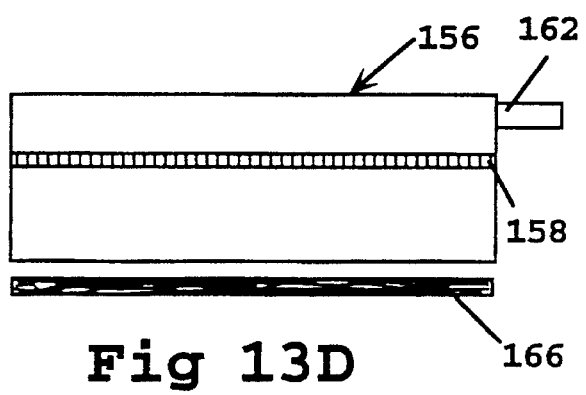

Finally, the dewatered panel, shown at 166 in FIG. 13D, is removed from the mold, and placed onto a handling fixture, such as a metal plate, to prevent block damage during handling. The wet block is dried in an oven, typically at a temperature between 150°–500° F.

In the dried matrix, the viscosity agent acts to bond the fibers at their intersections, forming a rigid, non-fused panel. The target density of the matrix after drying is between about 1.8 to 7.5 pounds/ft$^3$. Details of the molding and drying steps, as applied to producing an exemplary silica, and silica/alumina fiber blocks, are given in Example 2, Parts A and B.

The green-state block may be formed to include sacrificial filler(s) that will be vaporized during sintering, leaving a random dispersion of desired voids in the final fused matrix panel, such as illustrated in Example 5. The fillers are preferably formed of polymer or graphite (carbon). In the embodiment of the invention in which the panel matrix has a uniform flow resistivity throughout, the sacrificial filler is uniformly dispersed throughout the slurry used in forming the green-state block.

D. Selected Pore Size Block

As indicated above, it may be desirable to produce sound-insulation materials with different pore sizes and flow resistivities, for use in a stacked-lattice structure designed to absorb engine noise efficiently over a broad range of sound frequencies.

The block-forming method just described can be modified in a variety of ways to achieve a desired mean pore size and flow resistivity in the sound-insulation material. In general, larger-diameter fibers produce larger pore sizes, allowing mean pore size to be increased by use of larger-diameter silica and/or alumina fibers, e.g., in the range 4–8 μm. The larger fibers may be mixed with smaller fibers, e.g., in the 2–4 μm range, or may be used as the sole fiber component in the block.

Increased pore size is also achieved by reducing the fiber packing in the matrix, and thus reducing matrix density. As indicated above, reduced fiber packing and density are achieved, during fiber settling, by settling under lower vacuum conditions, where the slurry is relatively viscous, and where fiber packing is produced by use of a pusher plate as well as a lower vacuum in the block-forming mold. Sacrificial fibers can also be used to increase pore size, as discussed above.

It will be appreciated that a gradient of different pore size distributions and mean pore sizes can be achieved within a block, by adjusting one or more of the above process variables to achieve a gradient of different densities, fiber sizes, or concentration of sacrificial fibers on progressing away from the sound-absorbing face of a block toward the back face.

E. Fused Fiber Matrix

In the final step of matrix formation, the green-state block from above is sintered under conditions effective to produce surface melting and fiber/fiber fusion at the fiber crossings. The sintering is carried out typically by placing the green-state block on a prewarmed kiln car. The matrix is then heated to progressively higher temperature, typically reaching at least 2,000° F., and preferably between about 2,200°–2,400° F., until a desired fusion and density are achieved, the target density being between 2 to 8 pounds/ft$^3$. One exemplary heating schedule for a silica/alumina matrix is given in Example 2C.

In a preferred method, discussed above, the matrix is formed with high-purity silica only or silica and alumina fibers that contain little or no contaminating boron. In order to achieve fiber softening and fusion above 2,000° F., it is necessary to introduce boron into the matrix during the sintering process, to form a silica/boron or alumina/boron eutectic mixture at the fiber surface. Boron is preferably introduced, as detailed above, by including boron nitride particles in the green-state block, where the particles are evenly distributed through the block.

During sintering, the boron nitride particles are converted to gaseous $N_2$ and boron, with the released boron diffusing into the surface of the heated fibers to produce the desired surface eutectic, and fiber fusion. The distribution of boron nitride particles within the heated panel ensures a relatively uniform concentration of boron throughout the matrix, and thus uniform fusion properties throughout.

Also during fusion, the viscosity and dispersant agent used in preparing the green-state block is combusted and driven from the block, leaving only the fiber components.

Where the green-state panel has been constructed to include a high content (greater than 25 percent) of sacrificial element, an intermediate temperature treatment is required to effectively ensure all the sacrificial fibers are vaporized during sintering. In sacrificial element concentrations of less than 25 percent, the high temperature sintering is also effective to vaporize this element, leaving desired voids in the matrix, such as voids randomly distributed throughout the panels upper surface that is subjected to the sound waves (Section V below).

Example 5 illustrates the preparation of a fused-silica matrix containing 30% sacrificial fibers. It will be appreciated that the presence of sacrificial fibers, by effectively expanding the void space in the matrix, can be used to reduce matrix density in a systematic way.

After formation of the fused-fiber matrix in flat, curved or complex shape, the matrix panel may be machined to produce the desired finished contours and configuration.

The following examples are intended to illustrate methods for forming and testing an acoustical panel formed in accordance with the invention, but are in no way intended to limit the scope of the invention.

EXAMPLE 1

Forming a Fiber Slurry

A. Fiber Pretreatment

Silica fibers were heat treated as described above. The bulk fiber is compressed into panels, e.g., using a Torit Exhaust System and compaction unit. The compressed panels are passed through a furnace, e.g., a Harper Fuzzbelt furnace or equivalent at 2150° F. for a minimum of 60 minutes, corresponding to a speed setting of about 5.4 inches/minute. The heat treatment is used to close up surface imperfections on the fiber surface, making the matrix more stable to thermal changes during fusion.

B. Preparation of Stock Acrylate Solution

The acrylate stock was prepared for dispersing the boron nitride powder into the fiber slurry. 18 parts by weight of acrylic acid polymer (Acrysol ASE-108 from Rohm Haas) was dissolved in 80.2 parts by weight deionized water (1 megohm) using a spatula. Ammonium hydroxide (reagent grade 28–30% W) at 1.80 parts by weight was added to the mixture during the stirring to help dissolve the acrysol. Mixing was continued until almost all the milkiness color was gone. Preparation of the stock solution is performed at room temperature of 68°±2° F.

Upon completion of mixing, the solution's viscosity was measured after a 24 hour waiting period. Using a Brookfield Synchro-Lectric Viscometer (Model LVT) with a number 3 spindle installed in the instrument, an appropriate sample size was adjusted for a temperature of 75°±5° F. The viscosity expressed in centipoise was measured at four spindle speeds (0.3, 0.6, 3 and 30 rpm) in ascending order. The solution must have the minimum viscosity reading defined in the table below.

| Spindle Speed (rpm) | Minimum Viscosity (Centipoise) |
|---|---|
| 0.3 | 32,000 |
| 0.6 | 24,000 |
| 3 | 12,000 |
| 30 | 4,000 |

C. Preparing a Fiber Suspension

A suspension of boron nitride and acrylate stock solution from Part B above was prepared by thoroughly mixing the constituents together. The weight percentages of the boron nitride was measured from between 3 and 15 percent of the total fiber weight.

The acrylate stock solution from Part B was added from between 2–50 percent of the total fiber weight. The stock solution is used to attach the boron nitride powder to the fibers, increase the slurry viscosity, and provide the dehydrated green-state block with low-temperature strength for handling.

D. Mixing the Fibers

The silica and silica/alumina fiber compositions were placed into a partially filled mixing container filled with deionized water. Once the fibers were dispersed, the remaining DI water was added until the desired fiber:water ratio was achieved. The slurry was mixed using a variable lowshear double impeller blade to disperse, but not chop, the fibers and allowed to age for an appropriate time (typically 0.5–4 hours). The boron nitride and acrylate stock solution suspension was added and blended into the slurry. The slurry was transferred to the vacuum forming mold for vacuum casting.

EXAMPLE 2

Preparation of Fused-Fiber Matrix

A. Forming the Fiber Slurry

The vacuum forming system used to form the matrix is equipped with a variable vacuum drain control to 28 inches of mercury.

The fiber slurry from Example 1 was transferred into the forming tank equipped with a paddle mixer. The mixer is used to stir the slurry to keep the fibers from settling between block forming. The vacuum forming mold having tall side walls for holding the slurry, is placed into the forming tank screen side up. The mold is immersed into the slurry, where it is allowed to fill, then removed from the tank. (When forming small quantities, the fiber slurry can be transferred directly to the vacuum forming mold rather than a forming tank. The forming mold must be prefilled with deionized water to the level of the screen to minimize settling during slurry transfer.)

Prior to vacuum forming the panel, the slurry in the mold is slowly stirred to remove any air bubbles. Vacuum is applied to the mold so that the fibers are drawn into the mold and compacted. When the desired fiber height is achieved, the fibers are dewatered to remove excess water prior to panel removal. The vacuum forming time ranges from 5 sec to 180 sec, and is timed when the vacuum is first applied to when the standing water is drained from the top of the block.

The vacuum is continued (dewatering step) until about 50 percent of the remaining water is removed from the block, or little water can be pulled from the block. The dewatering period typically ranges from 0.5–30 minutes.

B. Drying the As-Cast Matrix

The as-cast matrix was placed on an Armalon lined handling fixture mounted on a baker's cart, and dried in an electrically heated drying oven set between 150° F. to 500° F. for a minimum of 16 hours. The target density of the matrix after drying is between 1.8 to 7.5 lb/ft$^3$.

C. Fusion of the Matrix

The dried matrix was sintered above 2200° F. using a bottom loading Harper Elevator Kiln or equivalent; equipped with a programmable controller, to achieve fired densities between 2.0 to 8.0 lb/ft$^3$. Kiln cars were pre-warmed to increase temperature uniformity in the kiln and around the materials being fired. The firing schedule includes the following ramp rates, temperature settings, and estimated soak times.

| Ramp | Temp | Soak Time |
| --- | --- | --- |
| start | 1800° F. | 12 minutes |
| 2° F./min | 1900° F. | 6 minutes |
| 1° F./min | 2100° F. | 6 minutes |
| 2° F./min | 2200° F. | as required to achieve target density |

The kiln was then cooled to 1800° F. prior to kiln car removal. The panel is cooled to below 200° F. and the fused matrix is removed from the car.

EXAMPLE 3

100% Silica Fiber System 2.54 pounds of high purity (99.68+%) heat treated silica fibers (Schuller, code 112 "Q" fibers, 2.51 um to 3.81 um in diameter) were dispersed in 127 pounds of deionized water (2% by weight) and mixed for 2 minutes using a low-shear double propeller mixer at 500 rpm to disperse but not chop the fibers. Then 80.4 grams of boron nitride powder (325 mesh, type SHP, Carborundum) was mixed into 287.2 grams of the Acrylate (Acrysol ASE-108 from Rohm Haas) stock solution as prepared in Part B. The boron nitride powder was mixed until a homogenous mixture was observed. The boron nitride/acrylate stock solution suspension was added to the silica slurry and mixed into the slurry using a low shear double propeller mixer for 2 minutes.

The slurry was poured into the vacuum forming mold after sufficient deionized water was poured into the mold to the level of the mold screen. The slurry was slowly stirred to dislodge air bubbles. Vacuum at 7 inches of mercury was applied to the matrix for 10 seconds (forming time). Vacuum pressure was maintained for another 10 minutes to remove excess water (approximately 50%). A wet block 27 by 27 by 2 inches in size was removed from the mold and dried for a minimum of 12 hours at 250° F. The dry density of the green-state block was 2.96 pounds per cubic foot (0.05 g/cc). The green-state block was fired at a ramp rate of 2° F. per minute to 2300° F. for 20 minutes. The fired density of the fused matrix was 3.13 pounds per cubic foot (0.05 g/cc).

The fused matrix was trimmed to one inch thickness and a 99 mm diameter specimen used to measure the air flow resistance per ASTM method C-522-87 "Standard Test Method for Airflow Resistance of Acoustical Materials". An air flow resistance value of 76,291 rayls per meter was obtained.

EXAMPLE 4

78% Silica Fiber and 22% Alumina Fiber System 107 grams of high purity (99.68+%) heat treated silica fibers (Schuller, "C" code "Q" fibers, 3.8 um to 5.1 um in diameter) and 30 grams of alumina fibers (ICI America, 2.5 um to 3.5 um in diameter) were dispersed in 3288 grams of deionized water and mixed for 1 minute using a low shear double propeller mixer at 500 rpm.

9.59 grams of boron nitride powder (325 mesh, type SHP, Carbonundum) was mixed into 27.4 grams of the acrylate (Acrysol ASE-108 from Rohm Haas) stock solution prepared per Part B. The boron nitride/acrylate suspension was added to the silica and alumina fiber slurry and mixed using a low shear double propeller mixer for 1 minute. Deionized water was poured into the vacuum mold to the screen level and the slurry was poured into the forming mold. The slurry was slowly stirred to dislodge any air bubbles then vacuum was applied for 15 seconds using 7 inches of mercury pressure. The vacuum was maintained for another 5 minutes until 50% of the water was removed and little water could be extracted.

The wet block, 7 by 7 by 1.5 inches in size was removed from the mold and dried for 17 hours at 180° F. The wet block was turned upside down and dried for another 7 hours at 280° F. The dry density of the green-state block was 4.91 lb/ft$^3$ (0.08 g/cc). The green-state block was fired at a ramp of 2° F. per minute to 2300° F. for 30 minutes. The fired density of the fused matrix was 4.76 pcf (0.08 g/cc) indicating the green-state block was not completely dry prior to fusion.

The fused matrix was trimmed to one inch thickness and a 99 mm diameter specimen used to measure the air flow resistance per ASTM C-522-87 "Standard Test Method for Airflow resistance of Acoustical Materials". An air flow resistance value of 67,587 rayls/m was obtained.

EXAMPLE 5

100% Silica Fibers and 30% Sacrificial Fiber System 56.1 grams of carbon fiber was dispersed with 4000 grams of deionized water and mixed for 7 minutes using a high shear Cowles Dissolver (approximately 2400 rpm) to chop the carbon fibers. The carbon slurry was poured over 187 grams of silica fiber (Schuller, "C" code, "Q" fibers, 3.8 um to 5.1 um inch diameter) and mixed using a low shear double propeller mixer for 1 minute. 18.7 grams of boron nitride powder (325 mesh, type SHP, Carborundum) and 37.4 grams of acrylate (Acrysol ASE-108 from Rohm Haas) stock solution prepared per Part B were mixed together, then the suspension was dispersed into the fiber slurry using a low shear double propeller mixer for 0.5 minutes. The slurry was placed into the vacuum forming mold and vacuum drained at 7 inches of mercury pressure for 30 seconds. The compressed wet block remained under vacuum for another 10 minutes to remove excess water then removed from the mold and dried for 23 hours at 200° F. The dry density of the 7 by 7 by 1.5 inch wet block was 6.77 lb/ft³ (0.11 g/cc). The wet block was dried for another 14 hours at 277° F. to remove excess water. The dry density after the second drying was 5.83 lb/ft³ (0.009 g/cc). The green-state block was fired at 1200° F. for 70 hours to removed the sacrificial carbon fiber, then fired at a ramp rate of 2° F. per minute to 2200° F. for 30 minutes. The fired density of the fused matrix was 4.72 pcf (0.08 g/cc).

The fused matrix was trimmed to one inch thickness and a 99 mm diameter specimen used to measure the air flow resistance per ASTM C-522-87 ""Standard Test Method for Airflow resistance of Acoustical Materials". An air flow resistance value of 33,329 rayls per meter was obtained.

While the invention has been described with reference to specific methods and embodiments, it will be appreciated that various modifications and changes may be made without departing from the invention.

It is claimed:

1. An acoustic structure for use as a sound insulator in a jet engine having a sound-absorbing compartment enclosed by a perforated sound-absorbing wall, said structure comprising a framework adapted to be held within said compartment, and disposed within said framework, an acoustical insulation material (a) having a sound-absorbing face adapted to confront the jet engine's sound-absorbing wall, and (b) composed of a rigid matrix of randomly oriented, fused silica fibers having fiber diameters predominantly in the range 2–8 µm, said matrix having (i) a three-dimensionally continuous network of open, intercommunicating voids, (ii) a flow resistivity between about 10–200K rayls/m, and (iii) a density of between about 2 and 8 lb/ft3.

2. The structure of claim 1, for use in a jet engine sound-absorbing compartment defined between such sound-absorbing wall and an opposite, solid back wall, wherein said framework includes a lattice of open cells disposed within said compartment, and said insulation material has opposite sound-absorbing and back faces adapted to confront the sound-absorbing and back walls, respectively, of the compartment.

3. The structure of claim 2, wherein the lattice cells are substantially completely filled with the insulation material.

4. The structure of claim 2, wherein a portion of the lattice cells are only partially filled with the insulation material.

5. The structure of claim 2, wherein said framework includes at least two such lattices in a stacked configuration, and the flow resistivity of insulation material in the lattice forming the sound-absorbing face of the structure is lower than that of the insulation material in the lattice forming the back face of the structure.

6. The structure of claim 5, wherein the structure includes at least three such lattices, each containing insulation material having a different flow resistivity.

7. The structure of claim 2, wherein the insulation material has a lower-to-higher flow resistance gradient, progressing in a direction from the sound-absorbing to the back face of the material.

8. The structure of claim 1, which has a density between 2–5 lb/ft³.

9. The structure of claim 1, wherein said framework includes spacer elements adapted for placement within the sound-absorbing compartment.

10. The structure of claim 9, wherein the insulation material is characterized by a flow resistivity between about 20K to 100K rayls/m at its sound absorbing face.

11. The structure of claim 9, wherein the density of the material is between 2–5 lb/ft3.

12. A method for reducing the level of sound in a jet engine having a sound-absorbing compartment enclosed by a perforated sound-absorbing wall and opposite solid back wall, and disposed within the compartment, a honeycomb lattice of open-face cells, comprising filling the lattice cells, at least partially, with an acoustical insulation material (a) having sound-absorbing and back faces adapted to confront the jet engine sound-absorbing and back walls, respectively, and (b) composed of a rigid matrix of randomly oriented, fused silica fibers having fiber diameters predominantly in the range 2–8 µm, said matrix having (i) a three-dimensionally continuous network of open, intercommunicating voids, (ii) a flow resistivity between about 10–200K rayls/m, and (iii) a density of between about 2 and 8 lb/ft3.

13. The method of claim 12, wherein the lattice cells are substantially completely filled with the insulation material.

14. The method of claim 12, wherein at least a portion of the lattice cells are only partially filled with the insulation material.

15. The method of claim 14, wherein the insulation material in the partially filled cells is distributed so as to create a spectrum of different compartment resonance lengths oriented in a direction normal to the cells' open faces.

16. The method of claim 12, for use in a jet engine having at least two such lattices disposed in a stacked configuration, wherein the flow resistivity of insulation material in the lattice forming the sound-absorbing face of the structure is lower than that of the insulation material in the lattice forming the back face of the structure.

17. The method of claim 16, wherein the structure includes at least three such lattices, each containing insulation material having a different flow resistivity.

18. A method of absorbing sound, comprising placing in the path of the sound, an acoustical insulation material composed of a rigid matrix of randomly oriented, fused silica fibers having fiber diameters predominantly in the range 2–8 µm, said matrix having (i) a three-dimensionally continuous network of open, intercommunicating voids, (ii) a flow resistivity between about 10–200K rayls/m, and (iii) a density of between about 2 and 8 lb/ft3.

19. A clad acoustic structure for use as a sound insulator in a jet engine comprising an acoustic insulation material having sound-absorbing and back sides and composed of a rigid matrix of randomly oriented, fused silica fibers having fiber diameters predominantly in the range 2–8 µm, said matrix having (i) a three-dimensional continuous network of open, intercommunicating voids, (ii) a flow resistivity between about 10–200K rayls/m, and (iii) a density of between about 2 and 8 lb/ft3, a solid composite ceramic backing fused to the back side of the material, and a perforated composite ceramic cover attached to the sound-absorbing side of the material.

20. The structure of claim 19, wherein said acoustic insulation material has a density of between 2–5 lb/ft³, and said composite ceramic backing and cover have a density of between about 50–150 lb/ft3.

* * * * *